Aug. 18, 1936.  A. J. BLOCK  2,051,514
DISCHARGE CONTROLLING DEVICE FOR STORAGE BATTERIES
Filed Nov. 27, 1933
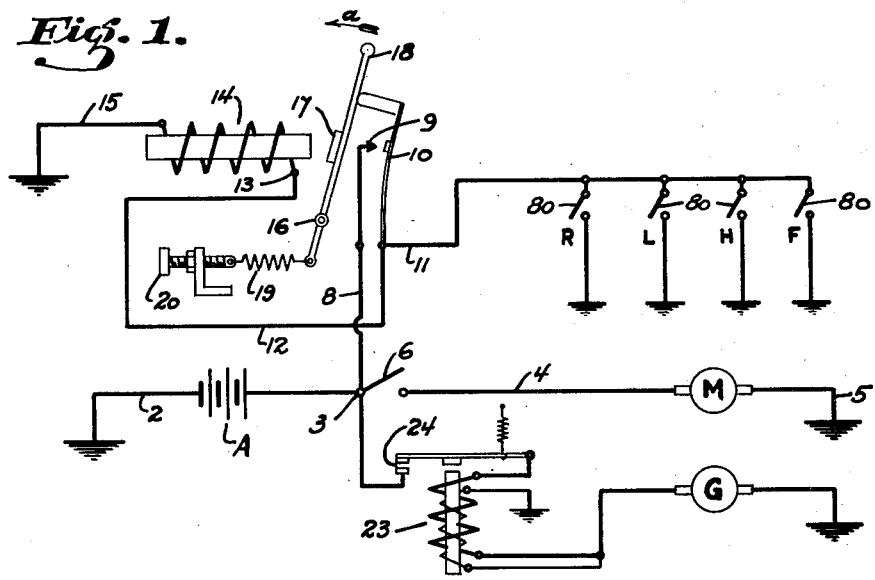
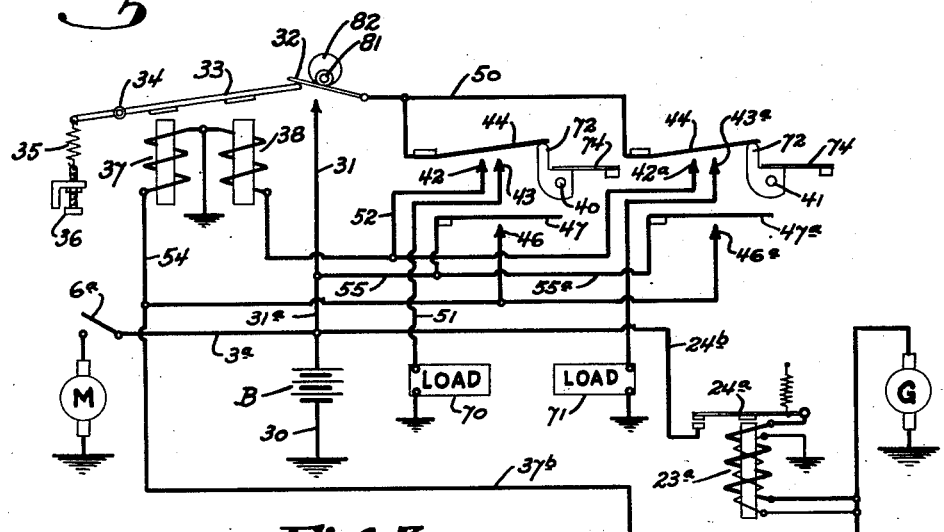
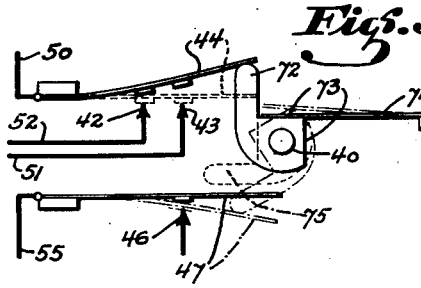
INVENTOR.
Abraham J. Block.
BY Townsend & Loftus.
ATTORNEYS.

Patented Aug. 18, 1936

2,051,514

UNITED STATES PATENT OFFICE

2,051,514

DISCHARGE CONTROLLING DEVICE FOR STORAGE BATTERIES

Abraham J. Block, San Francisco, Calif.

Application November 27, 1933, Serial No. 699,893

7 Claims. (Cl. 171—314)

This invention relates to a discharge controlling device for storage batteries.

Automobiles and like motor driven vehicles are, practically in all instances, provided with an electric starter and a storage battery which main function is that of supplying current to operate the starter. Batteries of this character also serve another important function, to-wit, that of supplying current for the lighting system, such as headlights, tail lights, stop lights, etc. A storage battery of proper make and capacity will under normal operating conditions supply ample current to take care of the load imposed by the starter and lighting system and, if that was all, comparatively little, if any, battery trouble would be encountered but unfortunately such ideal conditions seldom exist as the average owner or operator of an automobile will load it with all kinds of electric accessories, such as signal systems, heaters, cigarette lighters, horns, fans, radios, etc. These devices may be used without any noticeable drain on a storage battery when the automobile is in operation, as under operating conditions the generator will supply most of the current required but, if the automobile is standing and the motor is stopped, no current will be supplied by the generator and all current will come from the battery, hence causing it to quickly discharge if one or more of the electric accessories such as the radio, etc., is being used. This heavy drain of current will cause a battery to run down and will require frequent recharging of the battery. It may also be stated that there is danger of damage to the battery by letting it discharge too low as sulphating, hardening and buckling of the plates may take place. Again, it should be pointed out that if the battery is permitted to discharge below a predetermined point that the starter may fail to operate and so may the lighting system. In other words by adding all the electric accessories there is a tendency to rob the battery of its charge and when it is actually called upon to perform its main function, such as supplying current to the starter or the lighting system, it may fail as it has become substantially discharged by the accessories employed.

The object of the present invention is to provide a discharge controlling device for storage batteries whereby the discharge of current from the battery is automatically cut off before there is any danger of sulphating the plates or buckling or hardening the same, and while there is sufficient current left to insure proper operation of the starter and lighting system.

The invention is shown by way of illustration in the accompanying drawing, in which—

Fig. 1 is a diagrammatic view showing one form of the discharge controlling device.

Fig. 2 is a diagrammatic view showing another form thereof.

Fig. 3 is an enlarged detail view of the manually actuated switch 40.

Referring to the drawing in detail, and particularly Fig. 1, A indicates a standard form of storage battery such as employed on automobiles and like motor driven vehicles. One terminal of the battery is connected with a ground through a wire 2 and the other side is connected with the terminal 3 of the starting switch 6. This switch is, in turn, connected through wire 4 with one terminal of the starting motor M and the opposite terminal is connected through wire 5 with the ground. When it is desired to start the motor it is only necessary to step on or depress the switch, indicated at 6, and when this is closed a circuit will be formed through the battery and the starting motor M, and when the electric starting motor has started the motor of the vehicle, switch 6 is released and the circuit is broken. The battery will also supply current to the lighting system of the car which is not shown. In this instance the battery is also shown as connected with a series of electric appliances, indicated by the letters R, L, H and F. These appliances will be referred to as the auxiliary load. The letter R stands for a radio receiving set; the letter L for a cigar or cigarette lighter; the letter H for an electric heater; and the letter F for an electric fan, or the like. Any one or all of these may be used, and if that is the case the drain on the battery A will be considerable.

In order to connect the auxiliary load with the battery A, wire 8 is connected to the terminal 3. The other end of the wire connects with a switch contact 9 and this cooperates with a flexible contact 10, this contact being connected through wire 11 with the auxiliary load shown. The contact 10 is also connected through a wire 12 with one terminal 13 of a magnetic coil or relay 14, the other terminal of said coil is connected with a ground through wire 15. Pivotally mounted adjacent the magnetic coil 14 at the point 16 is an armature arm 17. This is provided with a projecting handle 18 whereby it may be manually operated as will hereinafter be described. The lower end of the armature arm 17 projects below the pivot 16 and it is connected with a spring 19, the tension of which may be adjusted through a screw 20.

In actual operation it may be stated that the auxiliary load or any other load imposed when the automobile is in operation, or in other words when the engine is running, is supplied by the generator generally indicated at G. The current from this generator passes through an automatic cut out relay 23 and contacts 24, it then passes through the terminal 3 to the battery A and the ground 2. The connection of the generator and the cut out relay is standard and the operation is well known. Briefly stated, as long as the generator is driven at the proper speed the potential of the current generated will be greater than that of the battery. The contact 24 will be closed and current will flow to the battery. On the other hand if the speed of the generator drops below a predetermined point or where the current potential is less than that of the battery, contacts 24 separate and discharge of the battery through the generator is accordingly prevented. If at any time it is desired to operate the starting motor, indicated at M, it is only necessary to depress the starter switch 6 and if it is desired to operate the lighting system, not here shown, it is accomplished by closing the switch in the usual manner.

The invention here involved is that of providing means for protecting the battery A against abuse, that is, preventing it from being discharged below a certain level and, particularly, to prevent auxiliary load devices, such as radios, electric fans, and so on, from robbing the battery of such an amount of current that either the lighting system or the starting motor will be rendered inoperative. Inasmuch as this is the main feature of the invention, particular reference will be made to the magnetically operated relay or cut out switch shown at 14 in Fig. 1. If it is desired to use any one of the auxiliary electric devices, indicated at R, L, H and F, it is first necessary to close the switch indicated by the numerals 9 and 10. This is accomplished by manually pushing the lever 18 in the direction of arrow a. In so doing a circuit is closed through the contacts 9 and 10 and current is thus supplied to the feed wire 11 which feeds the electric auxiliary device. Each of these devices is provided with a switch as shown, and by closing a particular switch the current will flow through that switch and through the radio or whatever auxiliary electric device is being used. At the same time contacts 9 and 10 were closed by manual operation through lever 18 a circuit was simultaneously closed through coil 14, causing it to become energized and thereby holding the armature 17 in the dotted line position shown. If the automobile is in operation, that is, if it is being driven along the highway, or otherwise, and the engine is running the main current supply will come from the generator G and the potential on the feed line will be approximately 7½ volts. If this is the case, the automatic cut out will be inoperative as the magnetic lines of force produced by the coil 14 are so great that there is no chance of the armature releasing itself. This, by the way, is an ideal condition as when the automobile is being driven there is considerable vibration but such vibration will not free the armature as it is held against the core of the coil with considerable force. For this reason it may be said that the magnetic cut out is inoperative when current is being supplied by the generator, and when current is being supplied by the generator there is no need of protecting the battery as sufficient current is supplied to take care of the auxiliary devices. On the other hand if the car or engine has been stopped no current is supplied by the generator and all flow will accordingly be from the battery A.

If a person is attending a picnic or loafing about in the country, it is common practice to turn on the radio and to let it play for hours. Under such conditions the battery A is rapidly being drained or discharged. If it was already partially discharged it would soon reach a point where either the starter or the lighting system would be inoperative. This, however, cannot happen with the equipment here shown. As the battery becomes discharged the voltage or potential of the current drops the magnetic flux or lines of force produced by the coil 14 will decrease in proportion and the point will be reached when the pull of the spring 19 will overcome the magnetic pull of the coil, thus releasing the armature 17 and the moment it is released it engages the switch contact 10 and breaks the circuit between the contacts 9 and 10. Thus, the auxiliary load is automatically broken the moment the current potential drops below a predetermined value. It has been found in practice that when a battery of this character is fully charged the current potential or voltage indicated is approximately 7 plus volts, and when the battery is reaching almost complete discharge the voltage is approximately 6. In the present instance the magnetic cut out may operate at substantially any point between 6 and 7 but for purpose of illustration let it be assumed that it is desired to cut out the auxilary load when the potential drops to 6½ volts. If that is the case and the radio is being played and the battery is gradually being drained, the magnetic relay will open the switch 10 the moment the voltage reaches 6½. The operator or driver of the car will then know that the radio should not be played any more; in fact, he cannot play it any more as the circuit has been broken. He will also know that the battery is reaching a low point of discharge and he can take that as a warning to see that the battery is re-charged at the first opportunity either by a long daylight drive or by removing the battery and having it charged in the usual manner.

By employing the automatic cut out here illustrated it is obvious that electric accessories, such as described, can be employed without danger of discharging the battery below a predetermined point, hence the danger of sulphating the plates, hardening them, or buckling them is avoided and the purpose for which the battery was originally installed is safeguarded as sufficient current will always remain to operate both the starter and lighting system.

In the structure shown in Fig. 1 the automatic cut out 14 operates on the auxiliary load only, as the lighting circuit and the starter operate entirely independent thereof. In some, if not most instances, it is desirable to include the automatic cut out in all circuits except perhaps the starter, for instance either the lighting or the ignition circuit is capable of running down or discharging the battery just as well as any of the auxiliary circuits described as it is possible that a person when leaving the car at night expects to be gone for only a few minutes and therefore leaves the headlights and dashboard lights burning. He or she may be delayed for one reason or another and the lights may be left burning for hours. Again, a person may leave the car in the garage at night and forget to turn out the dashboard light. The car may not be needed or used for a week or more thereafter and it will then be found that the battery is dead, or in other words, completely discharged.

To protect the battery against neglect, forgetfulness, etc., the structure shown in Fig. 2 is employed. In this instance B indicates the storage battery, one terminal of which is connected with a ground as indicated at 30, while the other terminal is connected with the contact 31 of a switch 32. This switch is normally held in open position by the armature arm 33 pivoted at 34. The arm extends beyond the pivot 34 and is connected to a spring 35, the tension of which may be adjusted to a screw 36. The armature arm is actuated by two magnets, indicated at 37 and 38, and their function will hereinafter be described. Two manually operated switches are shown and are indicated at 40 and 41. A pair of stationary contacts 42 and 43 cooperate with a movable contact 44 actuated by the manual switch 40. A second contact 46 cooperates with another movable contact 47 actuated by the manual switch 40. The contacts 42 and 43 are supplied with current when engaged by the movable member 44 as this is connected with a feed wire 50 which is connected with switch 32 and thereby receives current from the battery through wire 31a. The contact 43 directs the current to the load, whatever it may be, for instance the lighting circuit. The current passing from contact 43 through wire 51 to the load and then to the ground. Contact 42 is connected with a wire 52 and this is in turn connected to one terminal of the magnet 38, the other terminal being grounded. The feed wire 31a also supplies current to the movable member 47 and when this engages the contact 46 current is directed to the magnet 37 through wire 54. The second manually operated switch 41 is provided with two stationary contacts 42a and 43a. These cooperate with a movable switch member 44a and this member is supplied with current through wire 50. A second stationary contact is shown at 46a. This cooperates with a movable member 47a and this is supplied with current from the feed wire 31a through the wires 55 and 55a. The contact 42a delivers current to magnet 38 and the contact 43a delivers current to a load which may be an auxiliary load, such as previously referred to, the ignition circuit, or the like, this load receiving current from contact 43a and wire 50. The contact 46a delivers current to the magnet 37.

A conventional type of generator indicated at G is employed. The feed side of the generator is connected with a cut out generally indicated at 23a which operates an armature 24a. When the generator is operated current passes through the relay 23a energizing the same and thereby closes the contacts of the relay. Current then passes through a wire 24b to one terminal of the battery or it may flow through the feed wire 31 to supply whatever load is connected. The generator is in this instance provided with a second feed wire 37b and this is connected with a wire 54 and one of the terminals of the magnet 37. The starting motor is indicated at M. This is connected with the battery B through a wire 3a, the starting switch being indicated at 6a. The manner in which a circuit through the starting motor is closed has already been described in conjunction with Fig. 1 and so has the operation of the cut out relay indicated at 23a. To describe the operation of the manually operated switches 40 and 41 reference will be made to Fig. 3. It will here be noted that the manual switch is pivotally mounted and that it is provided with an arm 72. It is also provided with a flat shoulder 73 which is engaged by a leaf spring 74. Movement of the leaf spring with the shoulder normally holds the switch arm in the full line position shown, thereby holding the arm 44 out of engagement with the contacts 42 and 43. The arm 47 on the other hand normally tends to remain out of engagement with the contact 46 but when the switch is rotated manually, arm 72 engages the arm 47 and forces it down into engagement with the contacts. The leaf spring will during such rotation ride out of engagement with the shoulder 73 and if the switch is released the arm will be swung back to assume the dotted line position indicated at 75, hence it will be noted that manual rotation of the switch will first cause arm 44 to engage the contacts 42 and 43, secondly arm 47 will be contacted causing it to be depressed into engagement with the contact 46, but when the switch is released the spring 74 will return it to the position shown in dotted lines at 75 where arm 47 is raised out of engagement with contact 46. Let it be assumed that it is desired to close the lighting circuit, that is, turn on the headlights, etc., and that the load imposed by said circuit is that indicated at 70. Closing of this circuit is accomplished by rotating the switch 40 as previously described. Such rotation causes arm 44 to engage contacts 42 and 43 and also causes a momentary engagement of arm 47 and contact 46. This contact will cause energization of the magnets 37 and 38 as current will flow from the battery through wires 31 and 55 to the arm 47 and then through the contact 46 to the magnet 37, the opposite terminal of which is grounded. This causes energization of the magnet and armature 33 is attracted, switch 32 is thus closed and current will simultaneously flow from wire 31 through the switch and through wire 50 to arm 44. It will then pass through contact 43 and wire 51 to the load which, in this instance is represented by the lighting circuit, and current will also flow through contact 42 and wire 52 to the magnet 38, which will hereinafter be referred to as the battery automatic cut out relay. It was already stated that arm 47 only momentarily engaged the contact 46, hence when arm 47 disengages this contact the circuit through the magnet 37 will be broken but it will not be broken through the relay 38 as a second circuit has been closed through the contact 42. The lighting circuit is now on and, if the operator should forget to turn off the lights or leave them burning for such a length of time as to discharge the battery below a predetermined point, the relay 38 will release the armature 33 and thus open the switch 32 and when this is opened the circuit through wire 50 is broken, hence causing complete deenergization of the relay 38 and breaking of the circuit through the load 70. Hence any danger of completely discharging the battery by leaving the lights on is avoided.

In describing the relay, indicated at 14 in Fig. 1, it was stated that it was possible to produce a relay or cut out of this character which was exceedingly sensitive to variations in current potential due to the fact that the armature was manually moved into engagement with the core of the cut out relay. It was further stated that the spring 19 was so adjusted that the moment the voltage dropped from 7 to 6½ volts the pull of the spring would be sufficient to pull the armature away from the core and thus break the circuit through the switch indicated by the contacts 9 and 10. It was also stated in connection with the description of Fig. 1 that the magnetic cut out or relay 14 was inoperative when the generator G was operating as the current potential of the generator G would under ordinary running conditions be about 7½ volts. This current would pass through the relay 14 and the armature would be held with considerable force so that jarring of the vehicle would not release the armature and it was for this reason that the relay 14 was inoperative when the vehicle was being operated. In other words the relay or cut out 14 was only operative when the vehicle was standing still and the motor and generator cut off. Under such conditions there is little danger of the armature being jarred loose and if an auxiliary load was connected with the battery the automatic cut out would release the moment the potential reached 6½ volts.

In the structure shown in Fig. 2 the magnet 37 serves two functions, first that of attracting the armature 33 so as to permit closing of the switch 32, and secondly that of assisting the relay 38 in holding the armature against release when the generator G is generating current. It was, however, stated when describing the operation of the manually operated switch 40 that the circuit through the magnet 37 was automatically broken when arm 47 moved away from the contact 46. This circuit through the magnet 37 is, however, re-established through wires 37b and 54, the moment the generator starts generating, hence both the magnet 37 and the relay 38 serve the function of holding the armature against release when the vehicle is being operated, and there is therefore no danger of the armature jarring loose when subjected to jolts or vibrations. It will therefore be noted that the functions of the magnet 37 are two-fold, first that of attracting the armature 33, and secondly that of holding it against accidental release when the vehicle is being driven. The circumstances are, however, different when the motor and generator have been shut off. In that case there is no current being delivered to the magnet 37 and armature 33 is, accordingly, held by the relay or automatic cut out 38 only and as this is a sensitive type of relay similar to the relay 14 shown in Fig. 1, it will release the armature the moment the load has drained or discharged the battery to a point where the potential drops to 6½ volts.

In the structure shown in Fig. 1 it has already been stated that the starter and lighting circuit were operated independently of the cut out, and it has also been stated that if any of the auxiliary loads are to be employed it is first necessary to manually throw or move the armature 17 into engagement with the core of the relay so as to permit closing of the switch 10 and then to close the switch for the particular electrical auxiliary to be employed; the switches referred to being those indicated at 80. In other words it is necessary to operate two switches whenever an electric auxiliary appliance is to be used in the structure shown in Fig. 1. This is not essential. It has already been described that the operation of the single manually operated switch 40 closes the circuit through the load, indicated at 70, or in other words, the lighting circuit. If another load, for instance, the ignition circuit indicated at 71 is to be employed switch 41 is operated. This functions in a manner identical to the switch 40 as it first closes the circuit through the contacts 42a and 43a and then momentarily closes the circuit through the contact 46a. This contact controls the circuits through the magnet 37 while the contact 42a establishes a second circuit through the magnet or cut out 38 and contact 43a establishes a circuit through the load 71. The switch 41 is operative entirely independent of the switch 40, or any other switch, and obviously the wiring system here shown may be extended to include as many switches as desired to take care of the different loads and the necessity of operating two switches to close a circuit through any load, whether it be a lighting load, ignition or an auxiliary electric appliance, is obviated.

Under certain conditions it is desirable to manually close the switch 32 and retain the switch in closed position. To accomplish this a shaft 81 is employed. This shaft is provided with a turn knob, not shown, which can be grasped to turn the shaft together with an eccentric on cam 82 secured thereon. This cam is secured on the shaft directly above the switch arm 32, hence when shaft 81 is rotated the cam will engage the switch arm and force it, together with the armature, downwardly into engagement with the contact 31 and when the turn knob is released this position will be maintained until the knob is again grasped and turned in the opposite direction.

The importance of this manual control and switch 32 is as follows: Let it be assumed that the battery has run down to a point where the relay 14, or the relay indicated at 38, will release when the cooperating armature is brought into contact therewith. The driver may be on the way home and while there is sufficient current left in the battery to start the starter still there is not enough current left for the relay to hold the armature and thereby maintain switch 32 closed. The driver may meet with engine trouble and, in that case, will need lights when he lifts the hood to inspect the engine, for instance he may have an extension cord with a light on it for working under the hood, and so on. Again, it is possible that he has some important papers that he wants to read and therefore requires a light. Under ordinary conditions if the manual control just described was not provided it would be impossible to turn on such lights as the relay would release, but by providing the manual control, to-wit, the shaft with the cam 82 mounted thereon it is possible to manually close the switch 32 and retain it closed as long as such lights, or any other load desired, are required. If the lighting circuit is controlled by the relay and it commences to get dark it would also be necessary to close the switch 32 with the manually actuated cam 82 as the relay would otherwise break the circuit. Again, it can be seen that by providing the manual control it is possible to keep the lights on until the driver reaches his destination.

While certain features of the present invention have been more or less specifically described and illustrated, it should be understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. The combination with an electric storage battery and a current consuming device connected in circuit therewith, of a magnetic relay having an armature, a core and an energizing coil, means other than said energizing coil for moving the armature into engagement with the core, said means simultaneously closing a circuit between the battery and the current consuming device and the coil to energize the core so as to hold the armature when brought into engagement with the core, means for automatically releasing the armature when the current potential of the battery drops to a predetermined point, said armature when released breaking the circuit from the battery through the current consuming device and the energizing coil of the relay, and means for rendering the relay inoperative and for holding the armature in positive engagement with the core of the relay when the current potential of the battery has dropped below a predetermined point.

2. The combination with an electric storage battery and a current consuming device connected in circuit therewith, of a magnetic relay having an armature, a core and an energizing coil, means other than said energizing coil for moving the armature into engagement with the core, a switch adapted to be closed by movement of the armature toward the core, said switch closing a circuit between the battery and the current consuming device and the coil to energize the core so as to hold the armature when the armature is brought into engagement with the core, means for automatically releasing the armature when the current potential of the battery drops to a predetermined point, said armature when released opening the switch and breaking the circuit between the battery and current consuming device and the energizing coil of the relay, and means for rendering the relay inoperative and for holding the armature in positive engagement with the core of the relay when the current potential of the battery has dropped below a predetermined point.

3. The combination with an electric storage battery and an electric current generator connected therewith, of a current consuming device connected in a circuit to receive current from either the battery or the current generator, a relay in said circuit, said relay having an energizing coil, a core and an armature cooperating therewith, a switch adapted to be closed by movement of the armature toward the core, said switch adapted to make or break the circuit from the battery and generator to the current consuming device and also a circuit through the energizing coil of the relay, manually actuated means for moving the armature into engagement with the core of the relay, means for automatically releasing the armature when current is derived from the battery only and when the potential of said current reaches a predetermined point, said armature when released opening the switch and breaking the several circuits, and means cooperating with the relay for holding the armature in engagement with the core of the relay when current is being supplied by the generator.

4. The combination with an electric storage battery and an electric current generator connected therewith, of a current consuming device connected in a circuit to receive current from either the battery or the current generator, a relay in said circuit, said relay having an energizing coil, a core and an armature cooperating therewith, a switch adapted to be closed by movement of the armature toward the core of the relay, said switch adapted to make or break the circuit from the battery and generator to the current consuming device and also a circuit through the energizing coil of the relay, manually actuated means for moving the armature into engagement with the core of the relay, means for automatically releasing the armature when current is derived from the battery only and when the potential of said current reaches a predetermined point, said armature when released opening the switch and breaking the several circuits, and a magnet cooperating with the relay and mounted in the circuit of the generator, said magnet holding the armature in engagement with the relay when current is being supplied by the generator.

5. The combination with an electric storage battery and an electric current generator connected therewith, of a current consuming device connected in a circuit to receive current from either the battery or the current generator, a relay in said circuit, said relay having an energizing coil, a core and an armature cooperating therewith, a magnet for pulling the armature into engagement with the core of the relay, a manually controlled switch for temporarily closing a circuit through the magnet to pull the armature into engagement with the core of the relay, said switch simultaneously preparing a circuit through the energizing coil of the relay and a circuit to the current consuming device, a switch actuated by the armature and adapted to be closed when the armature engages the core of the relay, said last-named switch completing the circuit through the energizing coil of the relay and the current consuming device, and means for automatically releasing the armature when current is derived from the battery only and when the current potential of the battery drops to a predetermined point, said armature when released opening the switch actuated by the armature and breaking the several circuits.

6. The combination with an electric storage battery and an electric current generator connected therewith, of a current consuming device connected in a circuit to receive current from either the battery or the current generator, a relay in said circuit, said relay having an energizing coil, a core and an armature cooperating therewith, a magnet for pulling the armature into engagement with the core of the relay, a manually controlled switch for temporarily closing a circuit through the magnet to pull the armature into engagement with the relay, said switch simultaneously preparing a circuit through the energizing coil of the relay and a circuit to the current consuming device, a switch actuated by the armature and adapted to be closed when the armature engages the core of the relay, said last-named switch completing the circuit through the energizing coil of the relay and the current consuming device, means for automatically releasing the armature when current is derived from the battery only and when the current potential of the battery drops to a predetermined point, said armature when released opening the switch actuated by the armature and breaking the several circuits, and a manually controlled cam engageable with the armature to hold it in engagement with the core of the relay when the current potential in the battery has dropped below a predetermined point.

7. The combination with an electric storage battery and an electric current generator connected therewith, of a current-consuming device connected in the circuit to receive current either from the battery or the current generator, a switch for making or breaking a circuit from the battery and generator to the current-consuming device, means for automatically opening said switch when the current is supplied from the battery only, and when the current potential of the battery drops to a predetermined point, and means for holding the switch closed when the current is being supplied by the generator.

ABRAHAM J. BLOCK.